March 19, 1957  R. P. GARRISON ET AL  2,785,904
INERTIA OPERATED CHUCK
Filed July 8, 1953
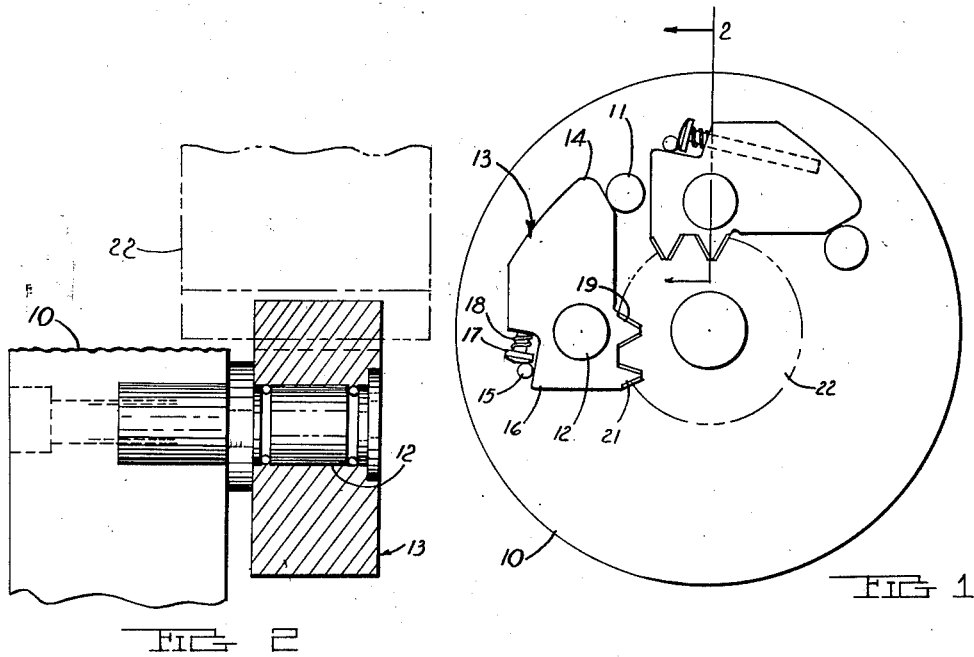
FIG. 1
FIG. 2
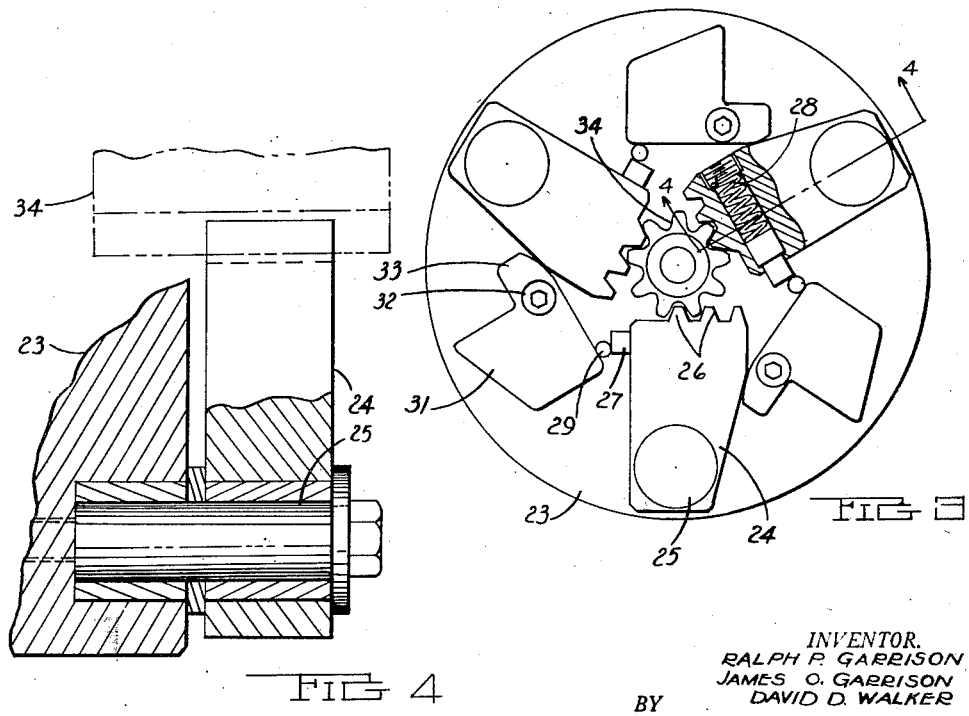
FIG. 3
FIG. 4
INVENTOR.
RALPH P. GARRISON
JAMES O. GARRISON
DAVID D. WALKER
BY
Tom Walker United States Patent Office 2,785,904
Patented Mar. 19, 1957

2,785,904

INERTIA OPERATED CHUCK

Ralph P. Garrison, James O. Garrison, and David D. Walker, Dayton, Ohio, assignors to Garrison Machine Works, Inc., Dayton, Ohio, a corporation of Ohio Application July 8, 1953, Serial No. 366,816

8 Claims. (Cl. 279—106)

This invention relates to chucks, for holding a gear or other work pieces while various machining operations are performed thereon, such as boring, grinding, facing and the like. More particularly, the invention has reference to chucks having toothed holding members which grip a gear through an intermeshing relationship with the teeth thereof, or which function as serrated jaws so that the chuck is adapted to grip and hold devices other than gears.

The object of the invention is to improve the construction as well as the means and mode of operation of chucks, whereby such chucks may not only be more efficient and satisfactory in use, automatic in operation, uniform and accurate in action but having relatively few parts and be unlikely to get out of repair.

An object of the invention is to provide a quick operating chuck, of especial utility in installations where manual, air, hydraulic or other means of opening and closing the chuck are not available or are undesirable.

Another object of the invention is to utilize centrifugal force, generated by rotation of the chuck body to cause chuck segments to move to locate and clamp the device to be held.

A further object of the invention is to provide resilient means for urging the chuck segments normally to an open position and for returning the segments to such position when the chuck body stops its rotation.

Still another object of the invention is to utilize the principle of a rack in applying the chuck segments to a gear, the segments being formed with rows of teeth in substantially tangential relation to the toothed area of the gear.

A still further object of the invention is to automatically close and open the chuck upon the work piece to be held in response respectively to the starting and stopping of the chuck body.

A further object of the invention is to provide a chuck having the advantageous structural features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawing wherein is illustrated several, but not necessarily the only form of embodiments of the invention, Fig. 1 is a view in front elevation of a gear chuck in accordance with a first illustrated embodiment of the invention;

Fig. 2 is a fragmentary view in cross section, of the chuck of Fig. 1, being taken substantially along the line 2—2 of Fig. 1;

Fig. 3 is a view like Fig. 1 and shows a second form of the invention; and

Fig. 4 is a view like Fig. 2 and is taken substantially along the line 4—4 of Fig. 3.

Like parts are indicated by similar characters of reference throughout the several views.

Referring to Figs. 1 and 2 of the drawings, a chuck in accordance with this embodiment of the invention includes a mounting head or support which in the operation of the chuck rotates about its longitudinal axis. Multiple screw studs 11 hold the head 10 in place upon the machine of which it is a part.

In a circular arrangement, about the longitudinal axis of the support 10 and mounted on the face thereof by respective screw studs 12, are gripping segments 13. The segments 13 are eccentrically disposed on their respective pivots 12, having elongated portions 14 in trailing relation to the stud 12 with reference to the direction of rotation of the support 10, which is counterclockwise as viewed, in Fig. 1. In response to rotation of the support 10 the elongated portions 14 tend to move outward to thereby rock the segments 13 in a counterclockwise direction about their studs 12. A normal position for each segment 13 is defined by a pin 15 set in the face of the support 10 and which is engaged on the one hand by a shoulder 16 on the segment and on the other hand by the head of a plunger 17. The latter has a sliding mounting in the segment and is urged resiliently outward into contact with the pin 15 by a spring 18. The arrangement is such that the head of plunger 17 limits against the pin 15, and the spring 18 accordingly presses the segment 13 in a clockwise direction about stud 12, the motion of the segment in this direction being limited by engagement of the shoulder 16 thereof with the pin 15. Rocking motion of the segments, in response to centrifugal force, is accomplished against the resistance of the respective springs 18 and when the support 10 stops turning the springs 18 are effective to return the segments to the normal position illustrated.

The several pivot studs 12 are located on respective lines extending radially from the longitudinal axis of the support 10. Located on each segment 13 is a plurality of teeth, 19 and 21. It will be noted that, with respect to the centrifugally induced motion of the segment 13, the tooth 21 is in following relation to the tooth 19. Further, it will be understood that centrifugal rocking motion of the segment 13 moves the tooth 19 past the axial line of pivot stud 12, and moves tooth 21 toward such axial line to thereby increase the effective length of the segment.

The teeth 19 and 21 of the several segments 13 are arranged for cooperative engagement with teeth on a gear to be held, as indicated, for example, at 22 in Fig. 1. The gear 22 is installed in the chuck by an axial insertion between the toothed jaws of the segments 13. The teeth on the gear are received in intermeshing engagement with the teeth on the segment, the latter penetrating the spaces between adjacent gear teeth a greater or lesser distance according to the size of the gear to be held. In the previously described normal position of the segments 13, which may be termed the open position of the chuck the gear 22 is primarily engaged by the tooth 19 and there is an absence of applied gripping pressure. Now, however, when the support 10 begins to rotate, the segments 13 immediately rock in a counterclockwise direction, as before described, bringing the tooth 21 of each into greater cooperation with the gear teeth to locate and clamp the gear 22 in conjunction with the companion tooth 19 and with the other segments 13. This is the closed position of the chuck. When rotation of the support 10 stops, the several segments 13 are returned by the respective springs 18 to normal position, releasing the gear 22 for withdrawal from the chuck.

It will be understood that the segments 13 are constructed and arranged for gripping engagement with gears 22 of smaller diameter than the one shown. If the gear 22 to be held is smaller than the one shown, there is merely a compensating increase in the degree of rocking motion permitted the segment 13 in response to rotation of the support 10. In this connection it will be further understood that the teeth 19 and 21 in effect define a rack and that the length of this rack may be increased if desired by adding more teeth in addition to teeth 19—21 shown.

It will still further be understood that the teeth 19 and 21 of the segments 13 broadly may be said to define serrated gripping jaws. As such they may be used to grip and hold articles other than gears, whether such articles have irregular or smooth surfaces.

The embodiment of the invention shown in Figs. 3 and 4 is similar to that of Figs. 1 and 2, in the construction and arrangement of its part and in the mode of operation and results achieved. The chuck of the second considered embodiment, however, provides a separate means for moving the gripping segments to locking position in response to rotation of the supports.

As shown, a support 23 mounts on the face thereof, a circular arrangement of gear segments 24. The segments 24 are sector shaped. The outer or smaller ends thereof are pivotally attached to studs 25 set in the support 23 on respective radial lines thereof. The inner or larger end of each gear segment 24 has a row of teeth 26 similar to the teeth 19 and 21 of the first considered embodiment. Transversely mounted in each segment 24 is a plunger 27 and a compression spring 28, the latter urging the plunger 27 laterally outward where it engages a pin 29 set in the support 23. Reacting against the pin 29, the plunger 27 urges the segment 24 to a normal position as indicated wherein a first one of the row of teeth 26 lies approximately in the same radial plane or line as the respective pivot 25. The several segments when so positioned define the open position of the chuck.

Also in circular arrangement about the longitudinal axis of the support 23, and in alternating relation to the segments 24, is a series of weights 31 eccentrically mounted on respective studs 32. Each weight 31 has a finger 33 projecting on one side of the pivot stud 32 and engaging the edge of an adjacent segment 24. The larger area of the weight 31 lies on the opposite side of the stud 32 and is normally engaged with a pin 29 by reason of the spring pressure applied to the plunger associated with the adjacent segments 24. That is, the resilient force developed by the spring 28 of each segment 24 is applied through the finger 33 of the associated weight 31 to hold such weight normally in a retracted position against an adjoining pin 29. In response to rotation of the support 23, the weights 31 move outwardly away from the pins 29, and, acting through the respective fingers 33, rock the segments 24 about their pivots 25 with the result that the teeth 26 achieve a gripping engagement with the gear 34 or other articles to be held. When the support 23 stops rotating, the springs 28 and plungers 27 operate to return the parts to the normal open position illustrated.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. An inertia operated chuck, including a rotatable support, means for mounting a work piece in concentric relation to the longitudinal axis of said support, including a plurality of freely pivoted holding devices in circular arrangement about the longitudinal axis of said support and mounted to an outer face of said support, pivot studs in said support for said devices on respective lines radial of said axis, said devices normally extending inward toward the axis of said support and terminating in a tooth for engagement with the work piece to be held, said devices automatically pivoting on said pivot studs in response to rotation of said support, and other tooth means in each of said devices in offset relation to the first said tooth and in following relation thereto with reference to the direction of movement of said devices automatically engaging and holding the work piece in response to rotation of said support.

2. An inertia operated gear chuck including a rotatable support, pivot studs set in said support in circular arrangement, sector arms pivotally attached at their one ends to said pivot studs and extending radially inward toward cooperative relation with a gear to be held, the opposite or inner ends of said sector arms being toothed for interfitting engagement with the gear, and eccentric devices mounted on said support in alternating relation to said sector arms and operable in response to rotation of said support to rock said arms about said pivot studs.

3. An inertia operated gear chuck, including a support rotatable about its longitudinal axis, a plurality of pivot studs set in said support on respective lines radial of said axis, a chuck arm freely and pivotally mounted on each of said studs, a tooth on each of said arms normally interfitting with the teeth on a gear to be held, means for effecting an automatic rocking movement of said arms about said pivot studs in response to rotation of said support, other teeth on each of said arms in following relation to the first said tooth for locking to the gear on the automatic rocking movement of said arms, and means defining a normal position for said arms including spring means normally resisting said automatic rocking movement thereof and serving also to return said arms to normal when rotation of said support is stopped.

4. An inertia operated gear chuck comprising, a rotatable support means, a plurality of toothed segments circumferentially arranged on one face of said support means, means eccentrically and freely pivoting each of said segments to said support means for intermeshing engagement with a gear to be held centrally thereof whereby, on applying a gear to said support intermediate said segments, and on rotation of said support means said segments will automatically pivot in response thereto and conjointly lock the gear, and on interruption of the rotation of said support means said segments will automatically pivot from said gear for release thereof.

5. An inertia operated chuck comprising, a support means rotatable about the central axis thereof, a series of rack segments circumferentially arranged at one face of said support means about the central axis thereof, means eccentrically and freely pivoting each of said rack segments to said support means on said one face, whereby on applying a work piece to said support means intermediate said segments, on rotation of said support means said rack segments will automatically pivot in response thereto and conjointly lock the work piece to said support means, and yielding means in engagement with said segments and normally resisting the pivoting thereof and operative on interruption of the rotation of said support means to urge said segments to a work piece releasing position.

6. An inertia operated chuck comprising, a rotatable support means, a series of holding segments circumferentially arranged at one face of said support means for engagement with a work piece to be held centrally thereof, means freely pivoting each of said segments to said support means at said one face thereof, spring means connecting each of said segments with said supoprt means in a normal work piece receiving position, whereby on applying a work piece to said support means at said one face thereof, on rotation of said support means said segments will automatically and conjointly pivot into locking engagement to the work piece, and on interruption of the rotation of said support means, said spring means will effect an automatic pivot of said segments from the work piece for release thereof.

7. An inertia operated gear chuck comprising, a rotatable support, a plurality of segments of an elongated nature carried thereby in circumferentially arranged fashion, each segment being eccentrically pivoted towards one end thereof and having a rack means integral therewith at one side thereof for normal slight intermeshing engagement with a gear to be held to said support between said segments, and means providing yielding connections between the respective segments and said rotatable support, whereby on drive of said support, said segments will automatically rock and lock to the gear therebetween and on interruption of said drive, said segments will be automatically returned to their slight intermeshing engagement with the gear.

8. An inertia operated gear chuck comprising, a rotatable support, a plurality of plate elements, each eccentrically pivoted adjacent one end thereof to a face of said support to lie in a common plane, serrated gripping jaws on one side of each plate element adjacent one end thereof commonly facing inwardly in the plane thereof, means between each of said plate elements and said support applying a normal bias thereto to dispose a serration of each plate element to lightly engage a gear centrally disposed between said plate elements whereby on rotation of said support, the plate elements will be automatically energized against the normal bias thereof to pivot and cause a positive lock of said jaws in holding relation to the gear therebetween.

References Cited in the file of this patent
UNITED STATES PATENTS

| | | |
|---|---|---|
| 1,494,056 | Benko | May 13, 1924 |
| 2,182,614 | Garrison | Dec. 5, 1939 |
| 2,207,621 | Hite | July 9, 1940 |
| 2,394,861 | Tourneau | Feb. 12, 1946 |
| 2,450,970 | Lance et al. | Oct. 12, 1948 |
| 2,474,633 | Marshall | June 28, 1949 |
| 2,543,117 | Mackmann | Feb. 27, 1951 |